Jan. 1, 1963 G. A. OLIVE 3,071,644

CONTROL SYSTEMS

Filed March 26, 1959 2 Sheets-Sheet 1

INVENTOR.
GEORGE A. OLIVE
BY Morris[signature]
ATTORNEY

INVENTOR.
GEORGE A. OLIVE
BY Morris [signature]
ATTORNEY

United States Patent Office 3,071,644

Patented Jan. 1, 1963

3,071,644

CONTROL SYSTEMS

George A. Olive, Lawrenceville, N.J., assignor to Radio Corporation of America, a corporation of Delaware Filed Mar. 26, 1959, Ser. No. 802,060
5 Claims. (Cl. 178—6.6)

Figure 1:
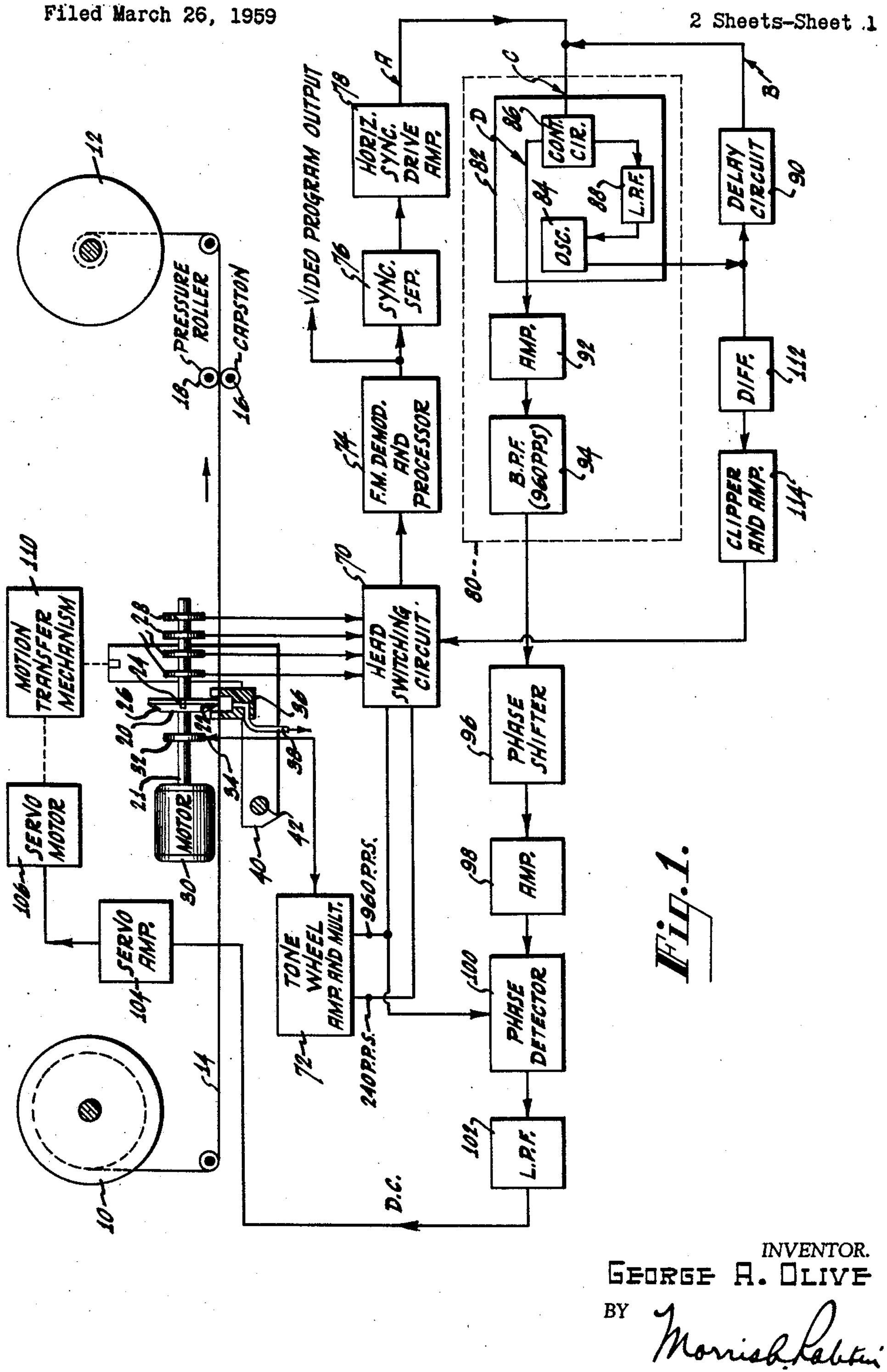

The present invention relates to control systems, and more particularly to control systems for detecting errors in the relative time of occurence of certain expected events and for counteracting such errors. While the invention is generally applicable in controlling apparatus having parts which execute periodic movements with respect to each other, it is especially suitable for use in magnetic recording and reproducing apparatus.

In magnetic recording and reproducing apparatus, signals must be reproduced in the exact time relationships in which they were recorded in order to prevent signal distortion. Errors in the times of reproduction of recorded television signals produce varying intervals between the synchronizing signal components thereof. The synchronizing circuits of conventional television receivers sometimes cannot follow such variations. This results in distortion of the reproduced television pictures.

In television tape recording or reproducing equipment of the type wherein successive tracks are recorded transversely across the tape, a rotatable wheel carrying a plurality of magnetic heads is used to scan the tape. This wheel is referred to herein as a "head wheel." The tape is pressed in an arc against the head wheel so that the tracks are successively scanned by different ones of the heads. A pressure shoe is used to press the tape in an arc against the wheel. Sometimes, the shoe is disposed to exert more pressure against the tape than was the case during recording. Sometimes, less pressure is exerted against the tape. The tape may then stretch or contract in width in response to the pressure variations. Ambient conditions, such as the surrounding temperature, may also produce variations in the width of the tape record. Similarly, minor variations in the speed of rotation of the head wheel or in the speed of tape travel in a longitudinal direction may cause scanning errors akin to errors produced by tape pressure variations.

These errors all result in variations in the intervals between successive synchronizing pulses of the recorded television signal upon reproduction thereof. In other words, the reproduced television signals are phase-shifted with respect to the recorded television signals. These variations are serious in that they result in a discrete interval between the times of occurrence of the last synchronizing pulse and the first synchronizing pulse reproduced from adjacent ones of the successive transverse tracks.

Television tape recording and reproducing equipment of the type described is designed to effect switching of the successive heads to an output circuit during the period of the horizontal synchronizing pulses. Since the errors mentioned above prevent the simultaneous occurrence of corresponding horizontal synchronizing pulses at successive heads, switching between these heads will take place at improper times. The variation in the intervals between one of these corresponding pulses and the next succeeding synchronizing pulse in the reproduced television signal may be sufficiently large so that the synchronizing circuits of conventional television receivers will not be capable of following the reproduced television signals. This will produce a distortion of the reproduced television picture on the "Kinescope" of the receiver. The television picture will appear with successive groups of horizontal lines displaced with respect to each other.

Careful manual adjustments of the pressure shoe were necessary prior to the present invention in order to minimize errors due to tape pressure variations. It is a feature of the present invention to provide means for detecting variations in the pressure of the tape against the head wheel and for automatically counteracting such variations.

In many automatic machines, moving parts must move in timed relation with respect to each other. A tool, for example, may execute periodic movements over a work piece. Variations in the times of occurrence, duration and the like of such movements may be automatically controlled in accordance with the present invention.

Accordingly, it is an object of the present invention to provide an improved control system for apparatus having parts which execute movements with respect to each other for detecting undesired variations in the period or rate of such movements, or in the intervals therebetween, and for controlling the apparatus to counteract such variations.

It is another object of the present invention to provide an improved control system for magnetic recording and reproducing apparatus for detecting phase, time or frequency variations in signals reproduced by such apparatus and for controlling the apparatus to counteract such variations.

It is still another object of the present invention to provide an improved control system for controlling the operation of scanning means in magnetic tape apparatus to counteract signal distortion during playback.

It is still another object of the present invention to provide an improved control system for detecting variations in the pressure of a magnetic tape record against a rotating scanning head assembly.

It is still another object of the present invention to provide an automatically operative control system for preventing the reproduction of distorted television pictures upon playback of magnetically recorded television signals due to variations in the pressure of the magnetic tape record against a rotating wheel carrying magnetic heads for scanning the record.

An embodiment of the invention may be incorporated in apparatus which generates a series of repetitive signals, such as pulses which are periodicaly recurrent in groups at a rate determined by the speed of the apparatus. In a television recording and reproducing apparatus which scans transverse tracks on a tape record, the repetitive signals are derived from the tape in groups recurrent at the scanning rate. Briefly described, the embodiment of the invention herein described includes means for detecting repetitive variations in the signals which produces a signal which varies periodically at a rate determined by the rate of recurrence of the groups of signals. This signal also will vary in phase with respect to a constant frequency signal recurrent at the same rate. Means are provided in the system provided by the invention for determining the sense and magnitude of such phase variations and for controlling the apparatus in response thereto for counteracting variations.

Figure 2A:
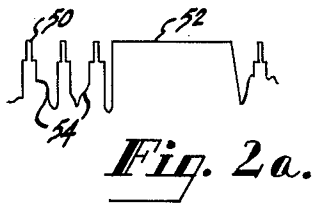
Figure 2B:
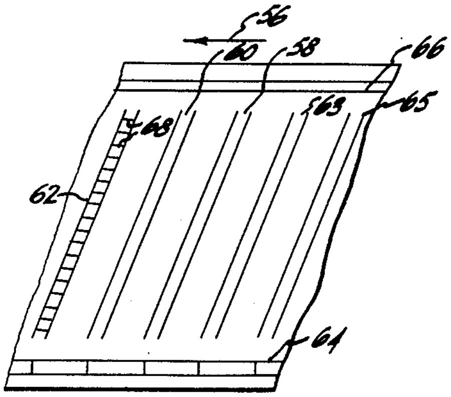
Figure 3:
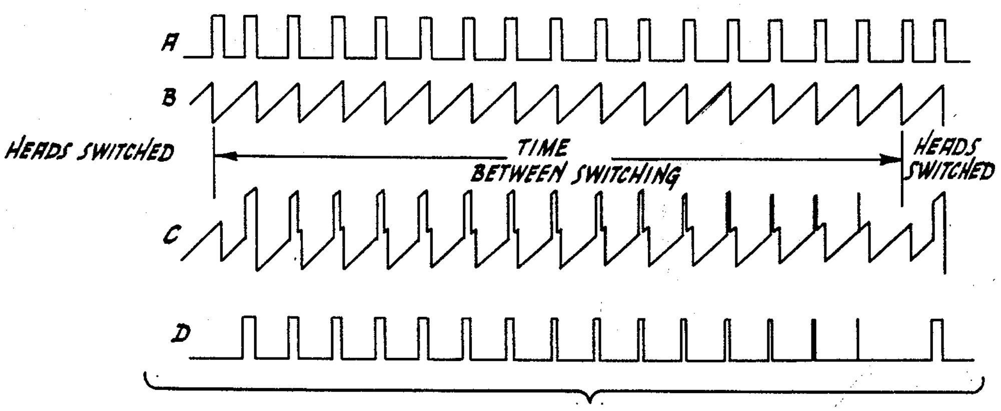

The invention itself, both as to its organization and method of operation, as well as the foregoing and other objects, will become more readily apparent from a reading of the following description in connection with the accompanying drawings in which:

FIG. 1 is a diagrammatic representation of one embodiment of a control system provided in accordance with the present invention and including a synchroguide circuit;

FIGS. 2*a* and 2*b* show, respectively, portions of a television signal and portions of a magnetic tape record having transverse tracks on which such signals are recorded; and FIG. 3 shows a series of waveforms of signals in the synchroguide circuit shown in FIG. 1.

In the interest of clarity, all ground returns have been omitted from the drawing. Thus, it may be assumed that a ground return is associated with each of the blocks employed in the drawings where necessary.

The present invention will be described hereinafter, by way of illustration, as it is employed in a transverse scan magnetic tape recording system suitable for recording and reproducing television signal information. As the description proceeds, it will become apparent that the novel features of the invention are not limited to such apparatus and may be employed for controlling apparatus, such as machinery, having parts which move with respect to each other.

Referring, now, more particularly to FIG. 1 of the drawings, a tape transport mechanism is shown including a supply reel 10 and a take-up reel 12. A tape record 14 is reeled from the supply reel 10 to the take-up reel 12 at a constant speed determined by the speed of rotation of a capstan 16. The tape is pressed against the capstan 16 by means of a pressure roller 18. The construction of the tape transport mechanism, the means for driving the supply reel 10 and the take-up reel 12, and the capstan 16 do not form part of the present invention and are, therefore, not described in greater detail herein. A more detailed description of the tape transport mechanism may be found in an article entitled "How the RCA Video Tape Recorder Works," by Jerome L. Grever, appearing in Broadcast News magazine, volume No. 100, April 1958, beginning at page 6.

The tape is scanned by means of a rotating head wheel 20 which carries four magnetic heads spaced 90 degrees apart on the head wheel. Three of these heads 22, 24 and 26 are shown in the drawing. The construction of the head wheel is also described in the aforementioned article by Jerome L. Grever and is further described in an application filed on February 2, 1959, in name of Henry Ray Warren, Serial No. 790,458, and assigned to Radio Corporation of America, now Patent No. 3,046,359, issued July 24, 1962. The head wheel 20 is driven by a constant speed motor 30 at 240 revolutions per second, for example. Slip rings 28 are mounted on a shaft 21 connecting the head wheel to the motor 30. These slip rings are connected each to a different one of the magnetic heads and are associated with brushes (not shown) for transmitting signals to and from the heads.

A tone wheel 32 is also mounted on the motor shaft and generates a pulse in a tone wheel pick-up 34 during each revolution of the head wheel 20. The tone wheel 32 is mentioned in the referenced article by Jerome L. Grever. The wheel is a member made of a magnetically susceptible material which has an opening therein of predetermined shape. The pick-up 34 is a magnetic transducer having concentric center and outer pole pieces. The center pole piece may be of substantially the same width as an opening in the tone wheel member. As the opening in this member passes over the pick-up transducer 34, any flux flowing through the transducer is decreased and a sharp voltage pulse will appear across the output of a pickup coil placed around the center pole piece. This tone wheel arrangement is described in greater detail in an application filed on November 20, 1957, in the name of Roy C. Wilcox, Serial No. 697,711, and assigned to Radio Corporation of America, now Patent No. 2,978,599, issued April 4, 1961.

The tape 14 is conformed to an arc around the head wheel 20 by a vacuum shoe 36 (similar to the vacuum shoe illustrated in the aforementioned Grever article) as the tape is being reeled in a direction along the axis of the head wheel 20 from the supply reel 10 to the take-up reel 12. In a typical television tape recording and reproducing apparatus, which is mentioned at this point solely for purposes of illustration, the head wheel 20 is two inches in diameter. The tape 14 is two inch wide magnetic tape which may be made of a one mil thick base of polyester plastic (Mylar) with a 0.0003 inch magnetic oxide coating. The vacuum shoe 36 holds the tape against the head wheel 20 in an arc of approximately 113 degrees. The tape is driven by the capstan 16 and pressure roller 18 arrangement at fifteen inches per second. The magnetic heads are 10 mils wide in the direction of tape travel. Thus, the scanning mechanism involving the head wheel and the vacuum shoe arrangement will scan, on the tape 14, transverse tracks having a pitch of 15.6 mils with a 5.6 mil blank space between the tracks.

The vacuum shoe 36 is connected to a vacuum source (not shown) by means of a hose 38. The shoe 36 is supported on an L-shaped member 40 disposed below the head wheel 20 and away from the motor 30 so as not to interfere with the operation thereof. The L-shaped member 40 is disposed on a pivot support 42 so as to permit the vacuum shoe 36 to be moved toward or away from the head wheel 26 in a controlled manner to be described hereinafter whereby the pressure of the tape 14 against the head wheel 20 may be controlled.

The circuits of the system shown in FIG. 1 are operative during playback or reproduction of the recorded television signals. The circuits which perform the recording operations and the means for switching between these recording circuits and the illustrative playback circuits are not shown in the drawings in order to clarify the drawings and simplify the description. These recording circuits do not form part of the present invention. However, the recording circuits are mentioned in the referenced article by Jerome L. Grever.

Signals recorded on the tape record 14 and reproduced therefrom are shown in FIG. 2*a* of the drawings. This figure portrays the conventional waveform of a composite television signal. The standard horizontal line synchronizing or sync signals 50 are components of this composite television signal. The vertical synchronizing components 52 are also part of the television signal. No attempt has been made to show the equalizing pulses and the horizontal sync serrations in the vertical blanking period, since these do not play a part in the hereinafter described operation of the invention. The picture information 54 is located between the horizontal synchronizing components. These television signals are recorded on a frequency modulated (FM) carrier, together with an audio sound track and another controlled track for controlling the servo systems associated with the tape transport which control the speed of tape reeling. These servo systems are not described herein but are mentioned in the Grever article.

FIG. 2*b* shows an enlarged section of the magnetic tape 14. The direction of tape travel is indicated by the arrow 56. The transverse tracks recorded on the tape by the rotating heads 22, 24, 26, etc. are indicated by path delineations 58, 60, 62, 63 and 65. The sound track 66 is disposed adjacent one edge of the tape, and the control track 64 for the tape speed control servo systems is disposed adjacent the opposite edge of the tape. The horizontal line synchronizing components are represented by the lines 68 on the transverse tracks. Only the horizontal synchronizing components on the track 62 are shown in the drawing, by way of illustration.

During playback, the heads on the wheel 20 will scan the tape 14 to reproduce the television signals recorded on successive ones of the tracks 65, 63, 58, 60, 62, etc. It will be observed that the tape 14 is scanned repetitively at a given rate determined by the speed of the head wheel. This is a cyclic scanning rate. Assuming that the wheel 20 rotates at 240 revolutions per second and that there are four heads mounted on a periphery of the wheel, there will be 960 scans per second. Each transverse track carries a plurality of synchronizing components due to the horizontal synchronizing components of the television signal. Each scan therefore produces a group of repetitive pulse signals and the groups of pulse signals are repetitive at a rate related to the speed of the head wheel which, in the illustrated case, is 960 group repetitions per second.

When the scanning mechanism is operating properly, the reproduced pulses in each group will be in the same time relationship in which they were recorded on the tape. Thus, the sync pulse to sync pulse intervals will be constant. In the case of horizontal synchronizing components which are repetitive at the standard rate of 15,750 per second, the reproduced sync pulses should also be repetitive at this same rate and separated by unvarying intervals. However, if some variation in the interval between the synchronizing components occurs during recording, corresponding variations should follow during playback so that there is no distortion introduced during the combined recording and reproducing process.

The invention provides means for eliminating the introduction of any time variations between the reproduced pulses during playback. The invention is suitable for use in recording systems of the transverse scan type, as illustrated herein, as well as in recording and reproducing apparatus which scans the tape longitudinally. The control system is responsive to the repetitive signals recorded on the tape. In the illustrated case, these repetitive signals are inherent in the information signal which is the television signal recorded on the tape. However, the system would be operative if a special control track having repetitive signals were recorded on the tape, or if some means responsive to the operation of the scanning mechanism, such as a tone wheel or similar transducer arrangement, were adapted to produce the repetitive signals. Accordingly, the invention may be applied to any machinery which has parts which must move with respect to each other at a certain rate (for example, a moving tool over a workpiece). The tool is analogous to the illustrated scanning head wheel and the workpiece is analogous to the tape. A system following the teachings of the present invention may be applied to control any scanning mechanism, such as that which would reciprocate a tool, in a manner to assure a uniform or any desired scanning interval.

Returning to FIG. 2*b* of the drawings, it will be noted that approximately eighteen lines of television information and, therefore, eighteen horizontal synchronizing pulses are recorded on each transverse track. A few of the lines recorded on the ends of each of the successive tracks are identical. There is, therefore, an overlap of information. In order to reconstitute the television signal upon playback, it is necessary to commutate or switch between the heads 22, 24, 26, etc. on the head wheel 20 during the period in which this overlap occurs. Thus, sixteen or seventeen lines of television information are actually used from each of the transverse tracks, during playback, in the illustrated tape recording and reproducing apparatus.

Referring again to FIG. 1, the slip rings 28 are connected by appropriate switching (not shown) to head switching circuits 70. It is the function of these head switching circuits to select the instant during the period of overlapping information (when the same signal appears on two of the adjacent heads on the head wheel 20) to switch the output circuits from one head to the next. This switching is designed to occur when the same horizontal synchronizing pulse appears on the adjacent heads during the overlap period in order to prevent the introduction of transients into the television picture. If variations in the interval between successive ones of the synchronizing components occur during playback, the same synchronizing pulse will not appear on the adjacent heads at the same time and a synchronizing pulse will be lost. The loss of this synchronizing pulse in the reconstituted television signal, as well as the variations in the synchronizing pulses during the course of reproduction, as was explained above, will provide a television signal which could not be properly utilized in a conventional television receiver.

The head switching circuits 70 are electronic switches operated in response to signals derived from the tone wheel 32, as well as to the horizontal synchronizing pulses. The signals from the tone wheel 32 are applied to a tone wheel amplifier and multiplier 72. It will be recalled that the signals from the tone wheel are pulses which have a repetition rate of 240 pulses per second. These pulses are amplified and shaped by conventional pulse circuits in the tone wheel amplifier and multiplier circuit and applied to the head switching circuits. The tone wheel amplifier and multiplier may also include a plurality of multivibrators triggered by the pulses from the tone wheel which are repetitive at 240 pulses per second. These multivibrators multiply by two and by two again to provide a signal at 960 pulses per second which is timed and synchronized with the 240 pulse per second signal from the tone wheel. The operation of the head switching circuits 70 is set forth in the aforementioned article by Jerome L. Grever.

Switching pulses at 960 pulses per second from the tone wheel amplifier and multiplier are applied to the circuits in the head switcher 70 to signal when each head on the head wheel comes into scanning relation with the tape. Horizontal synchronizing pulses are separated from the recovered television signal in a manner to be described hereinafter to operate a bi-stable multivibrator in the switcher 70 at the instant that a horizontal synchronizing pulse occurs whereby to operate certain radio frequency switches in the switching circuit to connect successive ones of the heads on the head wheel 20 to an FM demodulator and processor 74. The switching circuits 70 are also described in greater detail in a patent application filed on October 11, 1957, in the name of Eric M. Leyton, Serial No. 689,678, and assigned to Radio Corporation of America, now Patent No. 2,979,562, issued April 11, 1962.

The composite television signal from the head switching circuits 70 is applied to the FM demodulator and processing amplifier 74. This circuit 74 contains a conventional FM demodulator and equalizing amplifier which compensate for the recording and reproducing characteristics of the tape system. The video program output may be obtained from the FM demodulator and processing circuits 74 as indicated in the drawing and applied to other utilization circuits.

The video program is then applied to a sync separator circuit 76 which strips the horizontal synchronizing and vertical synchronizing components from the television signal. This circuit 76 may be of the conventional type found in commercial television receivers. The synchronizing pulses are applied to a horizontal sync drive amplifier 78 which contains conventional integrating circuits for eliminating the vertical synchronizing components and which amplifies the horizontal synchronizing pulses. The horizontal synchronizing pulses are then fed to a system of circuits (enclosed by the dash line 80) which senses any repetitive variation in the interval between successive ones of the synchronizing pulses. Since such pulse to pulse interval variations are essentially manifested as phase-shifts, the system of circuits 80 is essentially a highly sensitive phase detector.

This system of circuits 80 includes a synchroguide circuit 82. This synchroguide circuit contains an oscillator 84 and a control tube circuit 86 labeled "Cont. Cir." which are connected by a low pass filter 88. This synchroguide circuit 82 is essentially conventional and similar to the synchroguide circuit described in the text "Color Television Engineering," by John W. Wentworth, published by McGraw-Hill Book Company, Inc. (1955), pp. 380–383. In the synchroguide circuit 82 illustrated herein, a delay circuit 90 is connected between the output of the oscillator 84 and the input (grid) of the control tube circuit 86. The purpose of this delay is to effectively advance the synchronizing pulses which will be applied to the head switching circuit 70 with respect to the synchronizing pulses derived from the tape to compensate for delays in the FM demodulator and processing circuit 74. The delay circuit 90 includes two cathode followers having a delay line connected between the cathode and grid of successive ones thereof.

The operation of the synchroguide circuit 82 will be better understood in connection with the waveforms shown in FIG. 3. The oscillator 84 is a blocking oscillator which produces an essentially sawtooth waveform which may be represented ideally as the waveform B in FIG. 3. Idealized waveforms are shown in FIG. 3 since they clarify the illustration and simplify the discussion. It will be appreciated that, in practice, certain transient effects will be exhibited in the waveforms. This sawtooth waveform is transmitted by the delay circuit 90. The delay imparted by the delay circuit 90 in no way affects the operation of the synchroguide for the system of circuits 80. The horizontal synchronizing pulses from the horizontal sync drive amplifier 78 are combined with the sawtooth waveform at the input (grid) of the control tube circuit 86. These horizontal drive pulses are represented by the waveform A in FIG. 3.

If the sawtooth oscillations from the oscillator 84 and the horizontal drive pulses are in proper phase relationship, the positive tip of the sawtooth will occur about halfway between the leading and trailing edges of the horizontal drive pulses. The combined waveform is therefore a sawtooth having half of the horizontal drive pulse perched on the peak thereof and half in the trough between successive sawtooth waves. This is the case shown in FIGS. 11–26 of the aforementioned text by John W. Wentworth. The combined horizontal drive pulses and sawtooth pulses exceed the cut-off bias of the control tube circuit 86. Consequently, the current flowing through the control tube is in the form of constant amplitude pulses whose width depends upon the relative phase of the horizontal drive pulses and the sawtooth waves from the oscillator 84. The control tube circuit is therefore essentially a phase detector for detecting the phase relation between the sawtooth wave and the horizontal drive pulses.

The sawtooth oscillator 84 is controlled by the current flowing through the control tube circuit. A voltage proportional to this current is applied to the grid of the oscillator tube through the low pass filter 88 which is a resistance-capacitance filter of the type conventionally used in synchroguide circuits. Since the low pass filter does not transmit fast variations in the current through the control tube circuit, the sawtooth oscillator 84 does not follow such variations. Therefore, the frequency of the sawtooth oscillations will be related to the average frequency of the horizontal synchronizing pulses and will not be affected by timing irregularities among the pulses. The synchroguide circuit therefore detects phase differences between the horizontal synchronizing pulses actually derived from the tape record and signals which are in phase with the horizontal synchronizing pulses that would be derived from the tape in the absence of errors in the operation of the scanning mechanism.

While a synchroguide circuit is preferred in a system incorporating the present invention, other phase detector circuits or phase discriminators may be used. For example, a locally generated wave at the horizontal sync rate of 15,750 pulses per second may be compared with the horizontal sync pulses from the sync drive amplifier 78 in a conventional phase detector circuit to provide an output indicative of the sense and magnitude of phase differences therebetween. However, the synchroguide circuit produces a reference wave from the horizontal sync pulses derived from the tape and having the timing irregularities in which these timing irregularities are eliminated. The synchroguide circuit therefore eliminates the need for an additional reference signal generator and, in in addition, has been found to be highly sensitive to small phase errors. Moreover, the synchroguide circuit does not produce zero errors as is the case with many conventionally used phase detectors.

Timing irregularities represented by varying intervals between successive horizontal synchronizing pulses are believed to be primarily due to improper pressure of the tape against the head wheel. Such improper pressure causes stretching or contraction of the tape. The times of occurrence of successive pulses therefore increases with respect to the average time of occurrence of the pulses as the interval between the times when the heads are switched increases. Thus, repetitive variations in the intervals between successive sync pulses will occur for each group of sync pulses reproduced upon the scanning of each of the transverse tracks on the tape. The period of these repetitive variations is equal to the period during which the sync pulses on a track are scanned. In the illustrated case, 960 scans occur per second. Thus, the period of each scan is $\frac{1}{960}$ second or about 148 microseconds. As mentioned above, switching between the heads takes place after each scan period. A horizontal sync pulse on the track about to be scanned will occur before or after the same horizontal sync pulse is scanned by the preceding head if the tape is stretched or permitted to contract in width, respectively. For example, when the tape pressure is too large, there will be fifteen or sixteen sync pulse to sync pulse intervals which are longer than average, followed by an interval, immediately after switching between heads, which is shorter than average. Conversely, when the tape pressure is too small, there will be fifteen or sixteen sync pulse to sync pulse intervals which are shorter than average, followed by a sync pulse interval, upon switching, which is longer than average.

The sawtooth oscillator 84 in the synchroguide circuit 82 does not follow these timing irregularities among the sync pulses because of the long time constant in the low pass filter 88 connecting the control tube circuit to the oscillator. Therefore, the plate current from the control tube circuit will be representative of the phase errors due to timing irregularities between the horizontal sync pulses derived from the tape and the sawtooth waves which do not have such variations.

The operation of the synchroguide circuit for the case where the pressure of the tape against the head wheel is too large is illustrated in FIG. 3. It will be noted from waveform A, which represents the horizontal sync pulses after amplification by the sync drive amplifier 78, that the sync pulse to sync pulse intervals increase as the interval between the times when the heads are switched increases. The sync pulse to sync pulse interval after switching will be shorter since the sync pulse scanned by the head on the head wheel which scans the succeeding track occurs sooner than expected. The composite waveform at the grid of the control tube circuit is illustrated in waveform C. This waveform represents the additive combination of waveform A and waveform B. Waveform B is the delayed output of the sawtooth oscillator 84. Due to the clipping action of the control tube circuit plate current, pulses indicated in waveform D are obtained from the control tube circuit. It will be noted that these pulses decrease gradually in width. If the tape pressure were too small, rather than too large, as indicated, the current pulses in waveform D would gradually increase in width. Thus, the variation in the width of the current pulses from the control tube circuit indicates the sense of the phase error. If the phase relationship between the horizontal sync pulses and the sawtooth wave is constant, as would be the case if the sync pulse to sync pulse intervals remained the same, the current pulses in the plate circuit of the control tube circuit 86 would be constant in amplitude and equal in width. These pulses would be repetitive at the sync pulse rate of 15,750 pulses per second. However, variations in the sync pulse interval will occur at the scanning rate which, in the illustrated example, is 960 scans per second. Thus, there will be a 960 cycle component in the plate current of the control tube circuit, as can be derived from a Fourier analysis of the series of pulses. The phase of this 960 cycle component is a measure of the sense of the error in the pressure of the tape against the head wheel and, therefore, of whether the sync pulse to sync pulse interval varies in an increasing manner or in a decreasing manner during each repetition of each group of sync pulses.

A voltage corresponding to the plate current in the control tube circuit 86 is amplified in an amplifier 92. This voltage may be obtained by transformer coupling to the output of the control tube. The plate circuit of the control tube may include the primary of a transformer which drives the amplifier 92. The output of the amplifier 92 is applied to a band pass filter 94 which may be a simple, tuned circuit. The output of the band pass filter is applied to a phase shifter 96 which may be an amplifier tube having a resistance-capacitance circuit connected between the plate and cathode thereof. The resistance may be adjustable. The output of the phase shifter 96 is applied to an amplifier 98 which amplifies this 960 cycle component. The amplifier 98 may, therefore, be a conventional audio amplifier. The output of the amplifier 98 is applied to a phase detector 100. The phase detector 100 also receives pulses from the tone wheel amplifier and multiplier circuit 72 having a repetition rate of 960 pulses per second. These pulses are timed in accordance with the scanning rate by means of the tone wheel 32 as explained above.

The phase detector 100 may be a four diode keyed clamp circuit. The pulses from the tone wheel amplifier and multiplier 72 are used to clamp the 960 sine waves ground potential upon the occurrence thereof. The output of the phase detector will therefore be a sine wave having a direct current component which varies in accordance with the phase relationship between the 960 cycle pulse reference wave from the tone wheel and the 960 cycle output signal from the system of sensing circuits 80. Alternative phase detector circuits may be designed for use in the illustrated system in accordance with the principles set forth in the text "Electronic Instruments," edited by Greenwood et al., and published by McGraw-Hill Book Company (1948). These circuits are identified as phase detectors and described in Section 12.12 of the referenced text.

The output of the phase detector is applied to a low pass filter 102 which may be a resistance-capacitance circuit which extracts the D.C. component of the signal provided at the output of the phase detector. This D.C. signal is an error signal which varies in polarity and magnitude in accordance with the timing irregularities in the sync pulses derved from the tape. This error signal may be used to control the scanning mechanism of the tape recorder in various ways.

In the illustrated embodiment of the invention, this D.C. signal is applied to a servo amplifier 104. This servo amplifier 104 may be of the conventional type used in recording potentiometers and having a chopper for chopping the direct current error signal at a 60 cycle rate to provide a 60 cycle control voltage having a phase relationship, with respect to the 60 cycle line voltage energizing the chopper, determined by the polarity and magnitude of the D.C. error voltage. Such servo mechanisms are available commercially from the Brown Instruments Company of Philadelphia, Pa. The servo amplifier 104 feeds a servo motor 106 which may be a two phase motor. The servo motor 106 operates a motion transfer mechanism 110 such as any suitable linkage which is coupled to the L-shaped member 40 for pivoting the L-shaped member toward or away from the head wheel. Such movement of the L-shaped member carries the vacuum shoe 36 toward or away from the head wheel and thereby varies the pressure of the tape against the head wheel in a manner to counteract and compensate for any undesired tape pressure variations. The tape pressure control is therefore automatically operative during the operation of the magnetic recording and reproducing apparatus on playback.

Synchronizing pulses for operating the head switching circuits 70 are derived from the oscillator 84 in the synchroguide circuit 82. The output of the oscillator 84 is differentiated by a differentiator 112. The differentiated sawtooth pulses are clipped and amplified in the clipper and amplifier 114. This provides sharp, horizontal sync pulses for operating the head switching circuit 70. As mentioned previously, these horizontal sync pulses are effectively advanced with respect to the horizontal sync pulses derived from the tape because of the delay imparted to the sawtooth wave from which the horizontal sync pulses for the head switching are derived from the oscillator 84 by the delay circuit 90. It will be observed, therefore, that the delay circuit does not in any way affect the operation of the sensing system 80.

An important feature of the synchroguide phase error detection circuit is that it is free of zero errors which are often a problem in servo systems. It was mentioned previously that an absence of timing irregularities in the horizontal sync pulses applied to the control tube circuit 86 would merely produce a plate current pulse train containing pulses of equal width repetitive at the sync pulse rate (15,750 p.p.s.). The band pass filter 94 will therefore not pass any signal in response to a 15,750 pulse per second voltage applied thereto. Thus, no signal will be applied to the phase detector and no output will be obtained therefrom. The servo motor 106 will therefore remain inactive until a timing error occurs.

From the foregoing description, it will be apparent that I have provided an improved control system by means of which distortion due to timing irregularities and repetitive variations in the intervals between successive pulses may be eliminated. While I have shown, in diagrammatic form, a television tape recording and reproducing apparatus incorporating a system in accordance with my invention, various components useful therein, as well as variations in the disclosed system, all coming within the spirit of the invention will, no doubt, readily suggest themselves to those skilled in the art. Hence, I desire that the foregoing shall be considered merely as illustrative and not in a limiting sense.

What is claimed is:

1. In apparatus for reproducing television signals having synchronizing signal components recorded along transverse record tracks on a magnetic tape record, said apparatus having means rotatable across said record for scanning said record tracks to reproduce said signals, a control system which comprises means responsive to said synchronizing signal components providing an output signal according to the difference between the repetition rate of said components and the average repetition rate of said components, means for deriving a sinusoidal component of said output signal having a frequency related to the speed of rotation of said scanning means, means for providing a reference signal related to the speed of rotation of said scanning means, means for detecting the phase difference between said reference signal and said sinusoidal component to derive an error signal in accordance with the magnitude and sense of said phase difference, and means responsive to said error signal for controlling said scanning means.

2. In apparatus for reproducing signals recorded on tracks extending across a magnetic tape record having rotatable means for cyclically scanning said record at a given rate to reproduce said signals and means for pressing said tape against said rotatable means, a system for detecting the pressure applied against said tape which comprises a synchroguide circuit driven by said signals from said signal reproducing means, a band pass filter coupled to said circuit and responsive to an output of said circuit for transmitting sinusoidal signals having a frequency equal to said cyclic scanning rate, means controlled by said signal reproducing means for producing a reference signal at said cyclic scanning rate, a phase detector, means for applying said signal transmitted by said filter to said phase detector and means for applying said reference signal to said phase detector, said phase detector providing an error signal varying in polarity and magnitude in accordance with the phase difference between said reference signal and said signal transmitted by said filter, and a servo mechanism for moving said pressing means toward and away from said tape in response to said error signal.

3. A control system for apparatus for reproducing signals from a record having a repetitive control signal recorded thereon, said apparatus having signal reproducing means including a device for cyclically scanning said record to reproduce said control signal, which system comprises means resopnsive to said reproduced control signal for generating a first reference signal having a repetition rate approximately equal to the average repetition rate of said control signal, means operated by said scanning device for producing a second reference signal recurring at said cyclical scanning rate, first phase comparison means for detecting phase differences between said first reference signal and said reproduced control signal to provide an output signal repetitive at said cyclic scanning rate, second phase comparison means for determining phase differences between said output signal and said second reference signal, and means responsive to the output of said second phase comparison means for controlling said signal producing means.

4. A control system for apparatus for reproducing signals from a magnetic tape record having control signals recorded transversely thereon, which apparatus includes, on one side of said tape, a rotating wheel carrying a plurality of magnetic heads for transversely scanning said record to reproduce said control signals, and a movable pressure shoe disposed adjacent said wheel on the opposite side of said tape for pressing said tape against said wheel, said system comprising a synchroguide circuit responsive to said reproduced control signals for producing an output signal corresponding to the phase difference between said control signals and a signal having a repetition rate equal to the average repetition rate of said control signals, a filter circuit coupled to said synchroguide circuit and responsive to said output signal to provide a signal having a frequency related to the speed of rotation of said wheel, means for generating a reference signal having a frequency equal to the frequency of the signal provided by said filter, a phase comparison circuit for comparing said reference signal and the signal provided by said filter for producing an output signal varying in magnitude and polarity in accordance with the phase differences therebetween, a device for moving said wheel and said pressure shoe with respect to each other to vary the pressure applied against said tape, and electromechanical means energized by the output signal from said last-named phase comparison circuit for actuating said device.

5. A control system for apparatus having pulse producing means including a movable scanning member for cyclically scanning a subject at a given rate so as to produce a series of repetitive pulse signals during each of said cyclic scans which comprises means responsive to said pulse signals for generating a first reference signal having a repetition rate equal to the average repetition rate of said pulse signals, means for generating a second reference signal having a repetition rate equal to said cyclic scanning rate, means for producing an output signal according to the variations in times of occurrence between said pulse signals and said first reference signal, means to derive from said output signal a second output signal having a frequency equal to said cyclic scanning rate, means for producing a third output signal according to the phase difference between said second output signal and said second reference signal, and means responsive to said third output signal for controlling said pulse producing means to counteract any of said variations.

References Cited in the file of this patent

UNITED STATES PATENTS

| | | |
|---|---|---|
| 2,866,012 | Ginsburg et al. | Dec. 23, 1958 |
| 2,867,685 | Johnson | Jan. 6, 1959 |
| 2,874,214 | Anderson | Feb. 17, 1959 |
| 2,942,061 | Pfost et al. | June 21, 1960 |